US006978884B2

(12) United States Patent
Lockwood

(10) Patent No.: US 6,978,884 B2
(45) Date of Patent: Dec. 27, 2005

(54) FLEXIBLE DRIVE SHAFT FOR LINE SHAFT CONVEYOR

(75) Inventor: Dirk A. Lockwood, 2251 Yorktown Dr., SE., Kentwood, MI (US) 49508

(73) Assignee: Dirk A. Lockwood, Kentwood, MI (US)

( * ) Notice: Subject to any disclaimer, the term of this patent is extended or adjusted under 35 U.S.C. 154(b) by 0 days.

(21) Appl. No.: 11/031,712

(22) Filed: Jan. 7, 2005

(65) Prior Publication Data

US 2005/0167248 A1    Aug. 4, 2005

Related U.S. Application Data

(60) Provisional application No. 60/541,400, filed on Feb. 3, 2004.

(51) Int. Cl.[7] ............................................. B65G 15/02
(52) U.S. Cl. .................. 198/831; 198/781.03
(58) Field of Search ......................... 198/780, 781.01, 198/781.03, 781.04, 781.9, 781.1, 789, 790, 198/831

(56) References Cited

U.S. PATENT DOCUMENTS

| 2,624,445 | A |   | 1/1953  | Wallman      |            |
|-----------|---|---|---------|--------------|------------|
| 3,791,898 | A |   | 2/1974  | Remi         |            |
| 3,799,325 | A |   | 3/1974  | Benson       |            |
| 3,826,351 | A |   | 7/1974  | Fromme       |            |
| 3,961,700 | A |   | 6/1976  | Fleischauer  |            |
| 3,983,986 | A | * | 10/1976 | Allard       | 198/793    |
| 4,193,492 | A |   | 3/1980  | Hammond      |            |
| 4,313,536 | A |   | 2/1982  | Fauth        |            |
| 4,887,707 | A | * | 12/1989 | Harms        | 198/781.03 |
| 4,993,539 | A | * | 2/1991  | Duce         | 198/659    |
| 5,099,986 | A | * | 3/1992  | Kuzub        | 198/666    |
| 5,669,483 | A | * | 9/1997  | Nolan        | 198/831    |

OTHER PUBLICATIONS

Misalignment, flexible couplings, p E-22.
Mathews Conveyor, Line Shaft Conveyors, Application Data, Mar. 1, 1998, pp G-62 to G67.

* cited by examiner

Primary Examiner—James R. Bidwell
(74) Attorney, Agent, or Firm—Warner Norcross & Judd LLP

(57) ABSTRACT

A flexible drive shaft for a turn portion of a transfer device, such as a conveyor. The flexible drive shaft can be made from wound steel, wound plastic, wound cable or other wound material. In one embodiment, multiple rollers are rotatably mounted to a support structure of the conveyor and traverse the turn portion of a conveyor. The flexible drive shaft can be mounted to the support structure, and can follow the turn portion. A connector can join the rollers and flexible drive shaft, so that force can be transferred from the flexible drive shaft to the rollers, causing them to rotate.

15 Claims, 4 Drawing Sheets

FLEXIBLE DRIVE SHAFT FOR LINE SHAFT CONVEYOR

This application claims benefit of U.S. Provisional application 60/541,400, filed Feb. 3, 2004, which is hereby incorporated by reference.

BACKGROUND OF THE INVENTION

The present invention relates to line shaft roller conveyor systems, and more specifically to drive shafts for such systems.

Roller conveyor systems are often used in production, transport and/or distribution settings to load, unload or otherwise move objects to a desired location. Roller conveyor systems are often used to move cardboard boxes, however, roller conveyor systems may be used to transport, load, unload or otherwise move virtually any type of object.

Many traditional roller conveyor systems utilize a belt to drive various rollers on the roller conveyor system. In belt-driven roller conveyor systems, a belt is typically attached to a power source at one end and connected to either a roller itself, or to a coupling device, which is attached to a roller. When under power, the end of the belt is turned by the power source, which ultimately turns multiple rollers, thus providing power to various rollers propels boxes and like objects along a designated pathway.

While many traditional roller conveyor systems utilize belts to drive various rollers, belt-driver roller conveyor systems (as opposed to shaft-driven systems) offer several disadvantages. The belt utilized in these belt-driven roller conveyor systems are typically made of high-density rubber, or other relatively flexible material, such that over time the belts crack, wear thin and/or break. In order to replace a cracked, worn thin and/or broken belt, the belt-driven roller conveyor system generally must be shut down for extended periods of time, while skilled laborers replace the belt. This may result in an interruption in business, which can cause delayed distribution and/or reduced sales.

Additionally, broken belts are problematic. To replace a broken belt, the belt-driven roller conveyor system usually must be shut down. Furthermore, when a belt breaks, it presents a potentially serious injury to any worker near the breaking belt. Also, over the course of time belts may stretch, causing them to slip. When a belt slips in a traditional roller conveyor system, it does not provide a steady, consistent and reliable connection to the power source. This can cause transportation inconsistencies on traditional belt-driven roller conveyor systems and ultimately may require shutting down the conveyor system and replacement of the belt that is slipping.

Roller conveyor systems may also be shaft-driven. Typical shaft-driven roller conveyor systems may have straight sections and/or corners, or corner sections, which allow the movement of objects not only in straight lines but around corners and bends. Conventional shaft-driven roller conveyor systems have multiple shafts connected by couplings and universal joints, hereinafter U-joints. In traditional shaft-driven roller conveyor systems, the multiple shafts are all straight, non-flexible shafts, which when connected to a U-joint may create an angle. When many straight non-flexible shafts are connected via U-joints, a corner or bend may essentially be formed by angling the shafts around a corner, thereby allowing the corner sections of roller conveyor systems to be shaft-driven.

However, there are many disadvantages associated with these types of shaft-driven roller conveyor systems. The U-joints which connect the straight, non-flexible shafts must be maintained. These joints require a proper fit, proper alignment, and proper lubrication. To align these straight, non-flexible shafts with U-joints, skilled laborers typically utilize large amounts of time to ensure proper alignment. Only then will these straight, non-flexible shaft-driven roller conveyor systems be functional. If a straight, non-flexible shaft becomes misaligned with a U-joint, the roller conveyor system must be shut down, a skilled laborer with the knowledge and know-how of aligning these types of systems must realign and/or replace either a straight, non-flexible shaft and possibly a U-joint. This shutdown of a straight, non-flexible roller conveyor system results in decreased and untimely distribution or transportation of objects.

Therefore, there is a need for a drive shaft for use in line shaft roller conveyor systems that has an increased reliability, decreased maintenance and decreased labor time due to the ease of installation of the drive shaft into a roller conveyor system.

SUMMARY OF THE INVENTION

The aforementioned problems are overcome in the present invention. One embodiment of the present invention includes a flexible drive shaft for a turn portion of a conveyor. The drive shaft can be made from wound steel.

These and other objects, advantages and features of the invention will be more readily understood and appreciated by reference to the detailed description of the invention and the drawings.

DETAILED DESCRIPTION OF THE INVENTION

Figure 3:
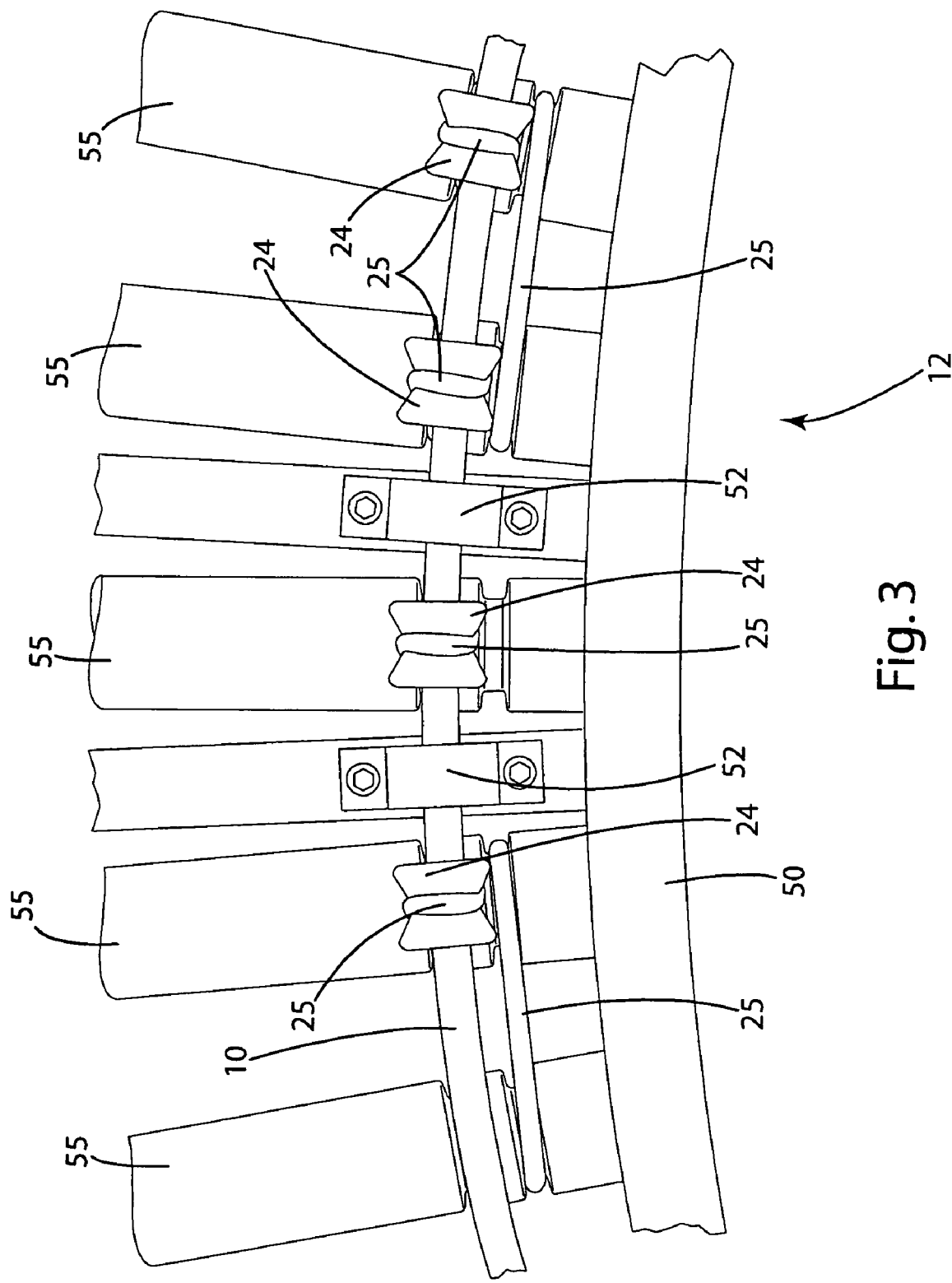
FIG. 3 is a side perspective view of the installed flexible drive shaft.

For purposes of description herein, the terms "upper," "lower," "right," "left," "rear," "front," "vertical," "horizontal," and derivatives thereof shall relate to the exemplary drive shaft 10 as oriented in FIG. 3. However, it is to be understood that the drive shaft may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
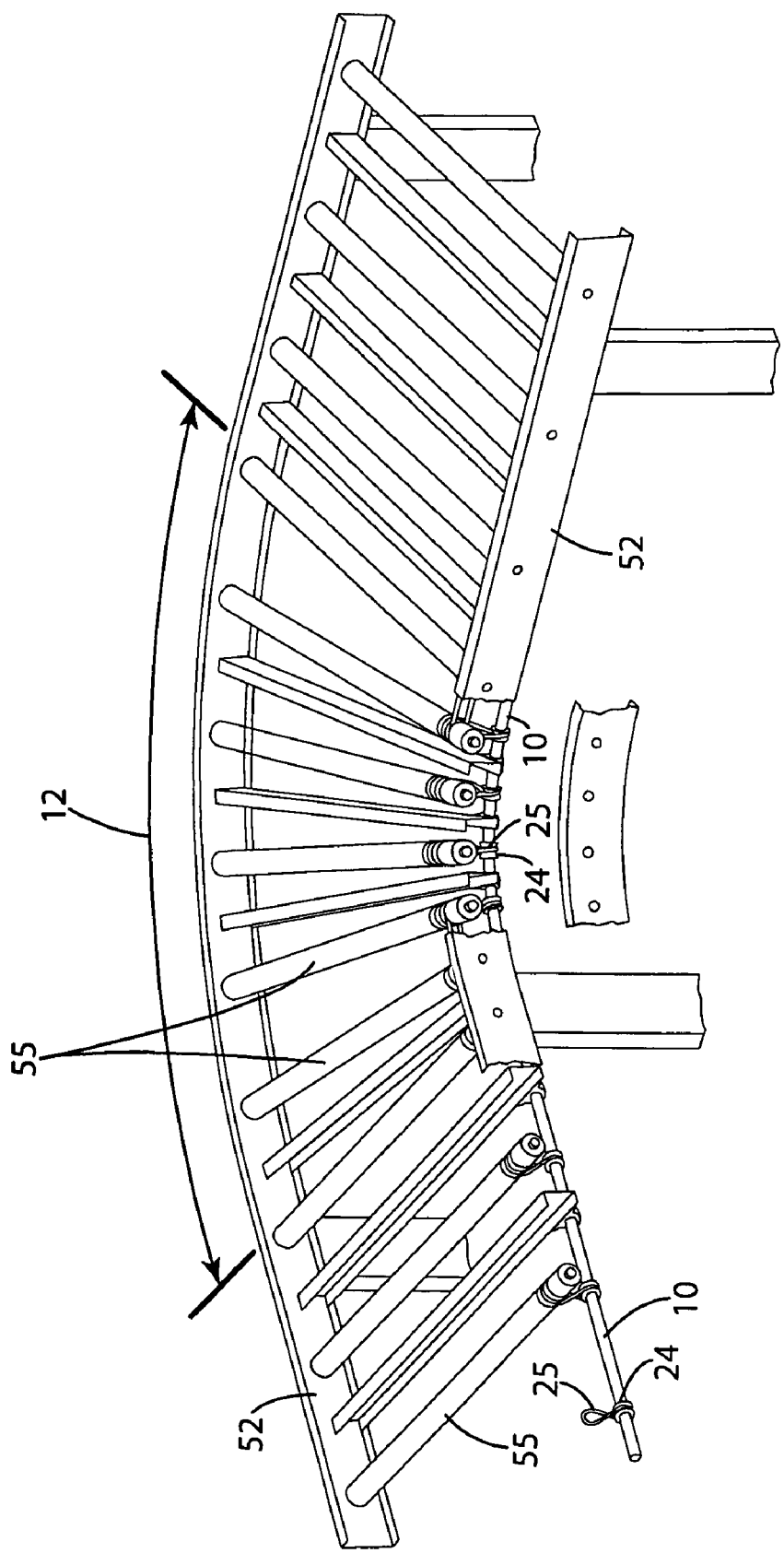
FIG. 1 is a perspective view of an installed flexible drive shaft of the present invention.
Figure 2:
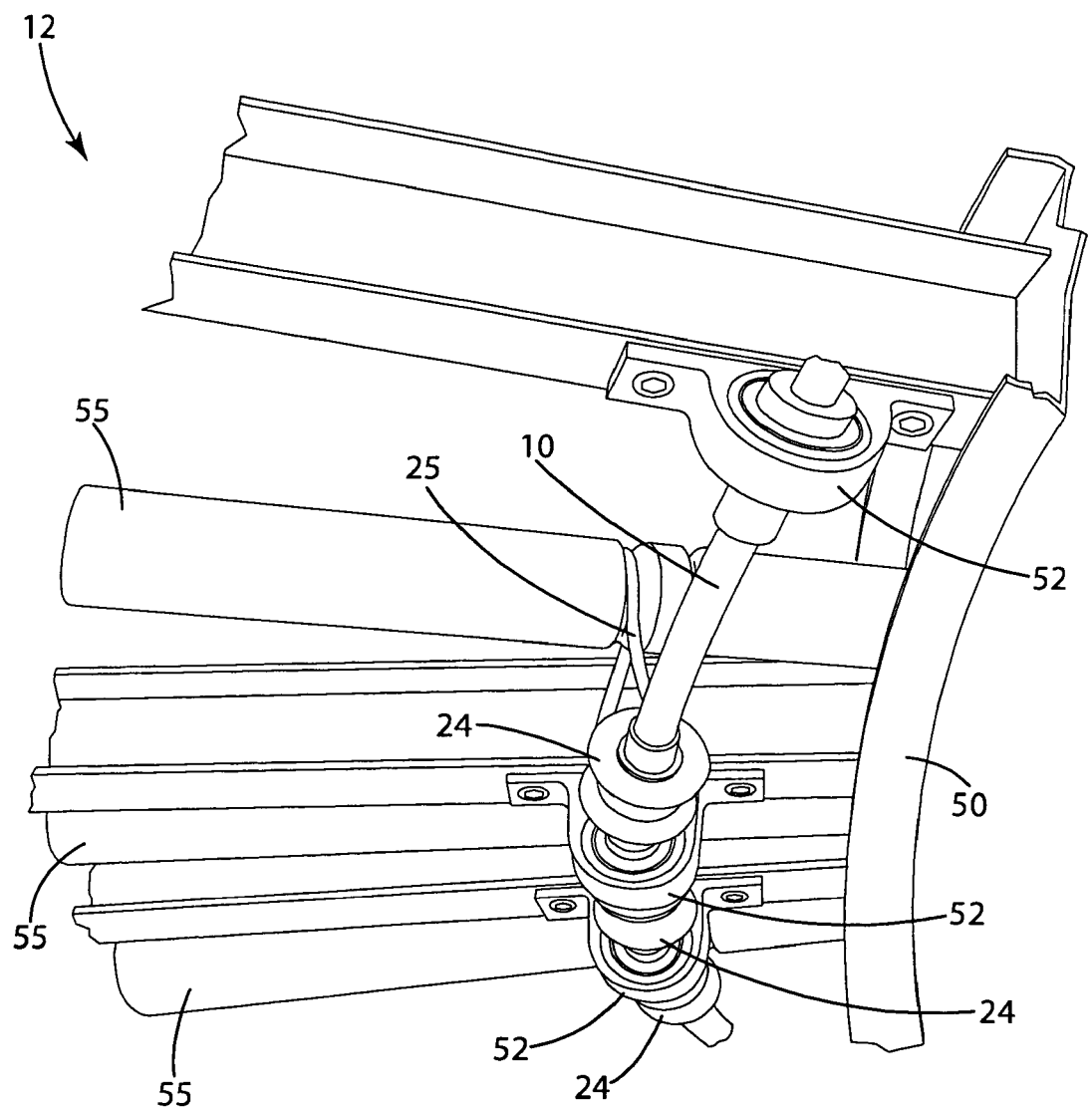
FIG. 2 is a second perspective view of an installed flexible drive shaft from an underside of a transfer drive.

One embodiment includes a flexible drive shaft for a turn portion of a transfer device, for example, a conveyor. The drive shaft is typically made from wound steel and a number of fittings are attached to the shaft. Referring to FIGS. 1–3, the drive shaft 10 can be installed in and be part of a conveyor of the type that typically conveys objects including, but not limited to, cardboard boxes; objects for transportation and/or distribution; and objects to load or unload, or any other type of object, including food stuffs. The flexible drive shaft as shown in FIGS. 1–3 is installed in the turn portion 12 of a conveyor.

Figure 4:
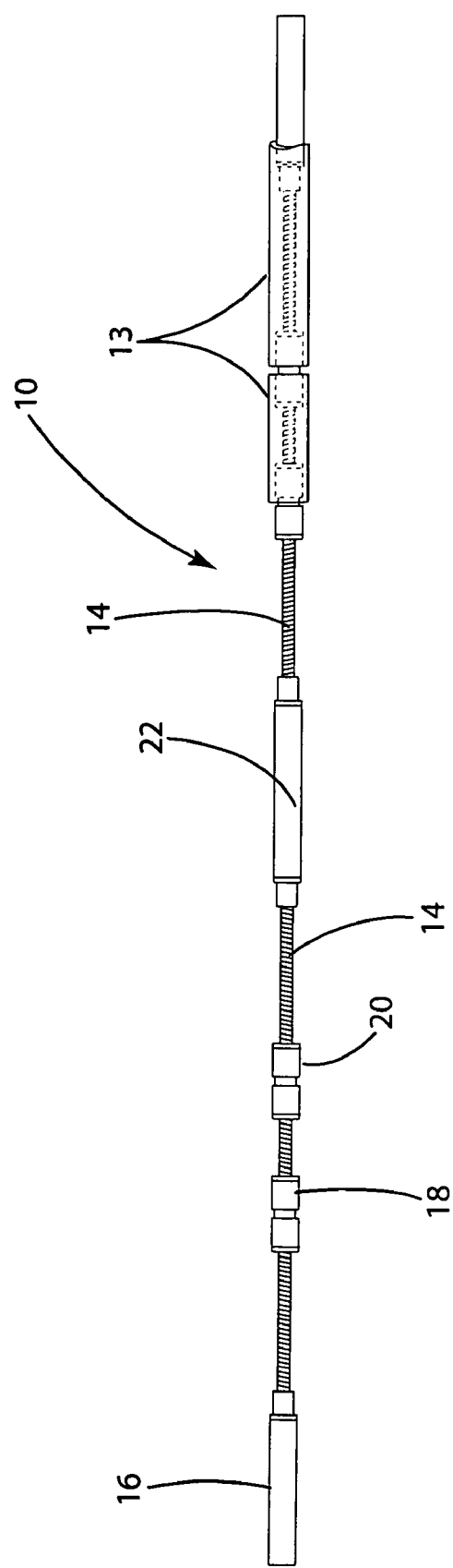
FIG. 4 is a top plan view of the flexible drive shaft.

Referring to FIG. 4, drive shaft 10 includes a main shaft 14 which may be made of any material, including, but not limited to, wound cable, wound steel, or wound plastics, or any combination or derivation of any of the above. As used herein, "steel" can include any type of steel product, including stainless steel. As an example, the wound steel material can include a plurality of steel wires aligned generally in parallel, and individually or collectively wound in a helical or semi-helical fashion. The wound steel wires need not be in a helical configuration; other structures may be used as described.

The flexible drive shaft 10 may be any length. Typically, the flexible drive shaft 10 may range in length anywhere from about 1 inch to about 20 feet. Additionally, the flexible drive shaft 10 may vary in diameter. The diameter of the flexible drive shaft 10 may range from about 1/8 of an inch in diameter to about 6 inches in diameter. The preferred wound steel may be wound by any industrial acceptable means that provides flexibility to the shaft. The wound steel shaft should be at least flexible enough to form a curve or to be capable of the curvature typically required by corners, or the corner sections, of roller conveyor systems. For example, the wound steel shaft can be flexible enough to curve around turns or corners being angled at about 30°, about 45°, about 60°, about 90°, about 120°, or any other angle as desired.

Main shaft 14 of drive shaft 10 may include any number of fittings 16, 18, 20 and 22. These fittings are generally adapted to receive drive spool 24 and connector 25 (see FIG. 3). The drive spool 24 may be disposed between any of the fittings 16, 18, 20 and 22 and the connector 25. The connector 25 extends between any of the fittings 16, 18, 20, 22 and the conveyor, or a coupling connected to the conveyor. A connector 25 connects the fitting 16, 18, 20 and 22 and drive spool 24 to the conveyor such that when main shaft 14 of flexible drive shaft 10 is turned, the connector attached to fittings 16, 18, 20 and 22 turns the conveyor roller 55 to which the connector 25 is attached. Typically, connector 25 is tensioned between drive spool 24 and the roller conveyor. If an object to be moved on the conveyor weighs too much for conveyor (i.e., if an object is placed on the conveyor that has a weight that is too great for the conveyor to move), drive spool 24 will slip and/or spin on the respective fitting(s) so that this weight resistance (i.e., increased torque and weight load) is not transferred to the power source.

The fittings 16, 18, 20 and 22 may be composed of any material, including, but not limited to, metal, plastic, wood, or any combination or derivation of any of the above. Additionally, the fittings 16, 18, 20 and 22 may be any shape as long as they are able to be attached to the main shaft 14 of the drive shaft 10 and are shaped to accept a line shaft conveyor drive spool 24, with retaining ring grooves to maintain the drive spool position. The fittings 16, 18, 20 and 22 may be connected to the main shaft 14 of drive shaft 10 by any type of connection, including, but not limited to, soldered, welded, adhered, bonded, screwed, or any combination or derivation of any of the above. Typically, the number of fittings positioned on the main shaft 14 of drive shaft 10 ranges from about 1 fitting to about 15 fittings per main shaft section. The fittings 16, 18, 20 and 22 may be spaced apart from one another on main shaft 14 as necessary to accommodate the roller conveyor system in which the flexible shaft is installed.

The fittings can also be adapted for securement to a conveyor support structure 50. In such a construction, the fittings can be captured by a bracket 52 which is further mounted to the support structure. The bracket can be configured to enable the fitting to rotate therein. Bearings or other components can be disposed around the fittings to improve rotation within the bracket 52. The brackets can be spaced along the support structure to provide a desired amount of curvature in the drive shaft 10 around a turn portion of the conveyor.

Alternatively, main shaft 14 of drive shaft 10 may not include any fittings. Instead, the flexible drive shaft of the present invention may be used as a connector shaft to connect two separate flexible or non-flexible (i.e., traditional drive shafts) drive shafts. The flexible drive shaft of this embodiment may include a short shaft at each end of the flexible shaft. The short shafts are connected to the remaining drive shaft(s) and/or a power source. The short shafts are typically connected to other shafts and/or a power source by utilizing couplings.

The flexible drive shaft 10 can also include a layer, coating, or tubing 13 to protect the shaft from corrosion, abrasion and/or excess wear. In one embodiment, a plastic tube is positioned over the entire drive shaft 10, or certain components as desired. The plastic tube can be shrunk, for example by heating, to be closely secured to the shaft. The tube can be cut in certain sections to expose the underlying fittings as desired.

Flexible drive shaft 10 eliminates the need for traditional straight non-flexible roller conveyor systems shafts of the past and U-joints. The flexible drive shaft 10 of the present invention enables a roller conveyor system to be utilized, which does not require a great deal of maintenance, prolonged shutdown time when a shaft needs to be replaced, or harbor the potential for injury as is the case with belt driven roller conveyor systems of the past. Rather the flexible drive shaft 10 of the present invention, when installed in a roller conveyor system, offers increased reliability and decreases the number of moving parts as compared to a straight non-flexible shaft-driven roller conveyor system of the past. Additionally, the flexible drive shaft 10 of the present invention is easy to install and offers decreased labor and decreased shutdown time if in fact a flexible drive shaft does need to be replaced.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A transfer device comprising:
    a support structure;
    a plurality of rollers rotatably joined with the support structure, the rollers oriented to collectively form a curved portion of a conveyor;
    a flexible drive shaft constructed from at least one of wound cable, wound steel and wound plastic, the flexible drive shaft flexed so that it follows the curved portion of the conveyor;

a bracket joined with the support structure, the flexible drive shaft rotatably mounted within the bracket, the bracket completely circumferentiating the flexible drive shaft;

a fitting non-rotatably secured to the flexible drive shaft, a drive spool joined with the fitting, the drive spool adapted to selectively slip and rotate relative to the fitting and flexible drive shaft; and a connector joined with at least one of the plurality of rollers and the drive spool, wherein the flexible drive shaft transfers force through the connector to rotate the at least one of the plurality of rollers, wherein the drive spool rotates relative to the fitting and flexible drive shaft when the at least one of the plurality of rollers is subject to an excessive load thereon, wherein selective slipping and rotation of the drive spool relative to the fitting and flexible drive shaft acts as a torque limiter.

2. The transfer device of claim 1, comprising a bracket mounted to the support structure, the flexible drive shaft rotatively mounted to the support structure with the bracket.

3. The transfer device of claim 1, wherein the connector is constructed of an elastimeric material.

4. The transfer device of claim 1, wherein the flexible drive shaft is stainless steel wound in a helical manner.

5. The transfer device of claim 1, wherein the flexible drive shaft is coupled to a drive spool.

6. The transfer device of claim 5, wherein the connector wraps around the drive spool and at least a portion of the roller.

7. A transfer device comprising:
a turn portion of a conveyor having a curvature around which articles can be conveyed;
a plurality of rollers forming a load bearing surface of the turn portion;
a flexible drive shaft constructed from a wound material, the flexible drive shaft following the curvature of the turn portion of the conveyor;
a support structure including a bracket, the bracket completely circumferentiating the flexible drive shaft;
a fitting non-rotatably secured to the flexible drive shaft,
a drive spool rotatably registered with the fitting; and
a connector joined with the drive spool and at least one of the plurality of rollers, wherein the drive spool slips and rotates relative to the flexible drive shaft when the conveyed articles accumulate near the at least one of the plurality of rollers joined with the connector.

8. The transfer device of claim 7, wherein the flexible drive shaft is constructed from at least one of wound steel, wound plastic and wound cable.

9. The transfer device of claim 7, comprising a connector connecting the flexible drive shaft and at least one of the rollers, the connector adapted to selectively slip relative to at least one of the flexible drive shaft and the roller.

10. The transfer device of claim 9, wherein the connector is constructed of an elastimeric material.

11. The transfer device of claim 7, wherein the turn portion of the conveyor includes a starting portion and an ending portion, the ending portion offset from the starting portion at least 45° so that articles traversing the turn portion change direction by at least about 45°.

12. A transfer device comprising:
a flexible drive shaft for a turn portion of a conveyor, wherein the flexible drive shaft comprises at least one of wound steel, wound cable and wound plastic, the flexible drive shaft including at least one fitting non-rotatably joined with the flexible drive shaft;
a roller positioned in the turn portion of the conveyor, the roller adapted for rotation;
a drive spool joined with the fitting; and
a connector joined with the roller and the drive spool, wherein the drive spool slips and rotates relative to the fitting when rotation of the roller is hindered.

13. The transfer device of claim 12, wherein the fitting includes at least one retaining ring to position the drive spool.

14. The transfer device of claim 13, wherein the drive spool engages the connector.

15. The transfer device of claim 13, wherein the flexible drive shaft is connected to a motor, which rotates the flexible drive shaft and subsequently rotates the roller.

* * * * *